United States Patent [19]

Peterson

[11] 4,430,065
[45] Feb. 7, 1984

[54] BARTLETT COUPLING

[75] Inventor: Robert R. Peterson, Hudson, Mass.

[73] Assignee: Barry Wright Corporation, Newton, Mass.

[21] Appl. No.: 195,240

[22] Filed: Oct. 8, 1980

[51] Int. Cl.³ .............................................. F16D 3/52
[52] U.S. Cl. ...................................... 464/90; 464/94; 464/150
[58] Field of Search ................... 64/6, 7, 8, 10, 11 F, 64/17 SP, 31, 32 F; 464/112, 113, 90, 94, 95, 125, 150, 181

[56] References Cited

U.S. PATENT DOCUMENTS

| 1,184,915 | 5/1916 | Bartlett | 64/6 |
| 2,067,286 | 1/1937 | Pearce | 64/17 SP |
| 3,800,557 | 4/1974 | Tobin | 64/17 SP |
| 4,194,372 | 3/1980 | Hannibal | 64/27 NM |
| 4,208,889 | 6/1980 | Peterson | 64/10 |
| 4,261,186 | 4/1981 | Hopf et al. | 64/17 SP |

FOREIGN PATENT DOCUMENTS 69744  7/1889  Fed. Rep. of Germany ...... 464/171

Primary Examiner—Billy S. Taylor
Attorney, Agent, or Firm—Milton E. Gilbert; Gary E. Ross

[57] ABSTRACT

An improved Bartlett type flexible coupling includes cylindrical laminated elastomeric bearing means between opposing cylindrical bearing surfaces and substantially flat laminated elastomeric bearing means between opposing flat bearing surfaces. One disclosed embodiment is an improved high angle fixed joint coupling comprising additional spherical sections connected to both of the driving and driven members and to each other so as to fix the axial position of each driving and driven member while allowing the members to rotate about axes which extend at an angle between 0° and 90°. The cylindrical and flat laminated elastomeric bearing means comprise alternating layers of an elastomeric resilient material and a nonextensible material to provide a more reliable coupling with improved performance.

11 Claims, 7 Drawing Figures

BARTLETT COUPLING

The present invention relates generally to couplings and more particularly to flexible couplings for transmitting torque between a driving member and a driven member.

A type of flexible coupling often referred to as the "Bartlett" joint coupling, is useful in joining rotatable driving and driven members. The respective axes of rotation of the driving and driven members are typically aligned with one another at a transverse angle between 0° and 90°, or are parallel and offset with respect to one another. Generally, the prior art "Bartlett" joint coupling comprises two intermediate members, respectively pivotally secured to the ends of the driving and driven members, and secured to one another by a tongue and slot arrangement. The tongue is provided by one of the intermediate members and is adapted to slide in the slot provided by the other intermediate member when the rotation axes of the driving and driven members rotate about axes which are offset or at an acute angle to one another. For a description of such a coupling see, for example, U.S. Pat. Nos. 1,184,915 and 1,491,186, and Jones, Franklin D., Ed., *Ingenious Mechanisms for Designers and Inventors*; Volume 1; The Industrial Press, New York, 1944, pp. 410–413.

The conventional prior art "Bartlett" coupling suffers from one or more limitations. Generally, the mutually opposing bearing surfaces of the driving, driven and intermediate members, which move in shear with respect to each other when the rotation axes are offset or misaligned are typically made of metal and therefore must be continually lubricated to avoid excessive wear and stress. Consequently, suitable boot seals must be provided for retaining the lubricant between the bearing surfaces. Failure of the boot seals, however, usually results in the drying of the lubricant and the subsequent failure of the coupling. In addition, even though the bearing surfaces may be provided with lubrication the bearing surfaces will heat from friction due to compression and shear stresses between the surfaces resulting in heat losses and more particularly, a loss of energy. Further, the opposing metal bearing surfaces can transmit noise and vibration. Further, vibration-induced wear can result. These opposing bearing surfaces carry limited compressive stress levels and provide relatively little in the way of restoring spring forces resulting from angular and/or axial misalignment occuring when the driving and driven members deviate from their proper axial positions. Because of the design of the coupling, it usually requires relatively close manufacturing tolerances, and accordingly the manufacturing costs of many of the couplings are relatively high. Finally, often backlash will occur in response to low reverse torques.

It is therefore a general object of the present invention to provide an improved coupling which overcomes or substantially reduces the problems of the prior art coupling.

A more specific object of the present invention is to provide an improved universal joint coupling of the Bartlett type which requires no lubrication.

Another object of the present invention is to provide an improved Bartlett coupling which reduces or substantially eliminates heat losses at the bearing surfaces thereby conserving energy.

And another object of the present invention is to provide an improved Bartlett coupling which includes improved bearing surfaces capable of carrying greater maximum compressional stress levels while accommodating relative shear motion.

Yet another object of the present invention is to provide an improved Bartlett type flexible coupling having bearing surfaces capable of providing restoring spring forces resulting from angular and/or axial misalignment between the driving and driven members.

Still another object of the present invention is to provide an improved coupling of the Bartlett type in which transmitted noise and vibration is reduced, vibration-induced wear is reduced, manufacturing tolerances are relaxed and thus manufacturing costs are reduced, and approximately zero backlash occurs when low reverse torques are applied.

And yet another object of the present invention is to provide an improved high angle fixed coupling to the Bartlett type.

These and other objects of the present invention are provided by an improved flexible coupling of the Bartlett type comprising cylindrical elastomeric laminated bearing means disposed between the opposing cylindrical bearing surfaces and substantially flat elastomeric laminated bearing means disposed between the opposing flat bearing surfaces of the coupling.

Other features and many attendant advantages of the invention are disclosed in or rendered obvious by the following detailed description taken in connection with the accompanying drawing wherein.

Referring to the drawings, the same numerals are used to designate like parts.

Figure 1:
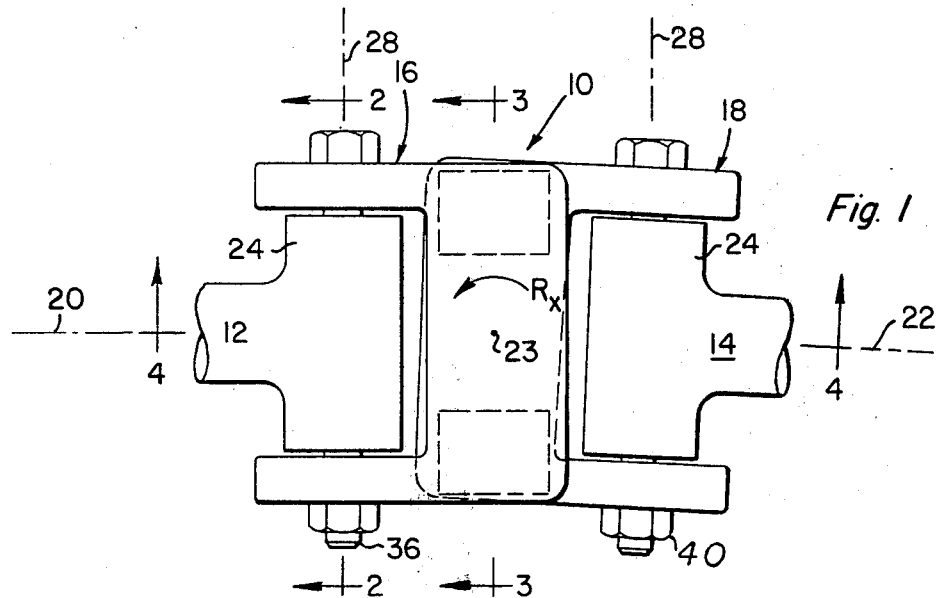
FIG. 1 is a plan view of the preferred embodiment of the flexible universal coupling of the present invention.
Figure 2:
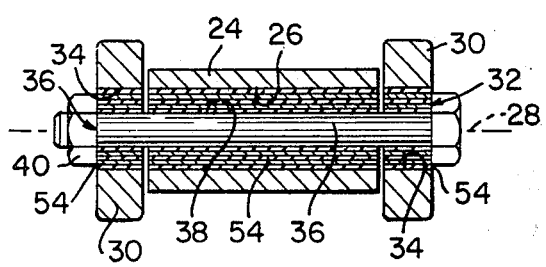
FIG. 2 is a sectional view of the FIG. 1 embodiment taken along line 2—2 of FIG. 1 and rotated 90° for convenience of view.
Figure 3:
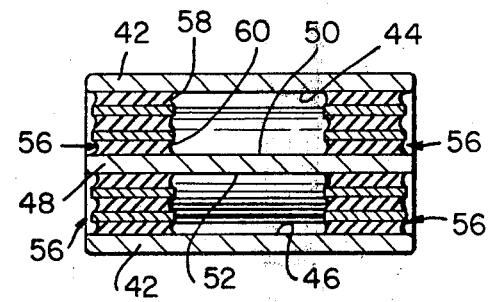
FIG. 3 is a sectional view of the FIG. 1 embodiment taken along line 3—3 of FIG. 1 and rotated 90° for convenience of view.

In FIGS. 1-4, the preferred embodiment of the Bartlett type flexible coupling incorporating the principles of the present invention is generally shown at 10. The preferred flexible coupling comprises substantially identical driving and driven members in the form of shafts 12 and 14, and two intermediate members 16 and 18.

Shafts 12 and 14 are each mounted by suitable means, such as rotational bearings (not shown), so as to be rotatable about the respective rotation axes 20 and 22. The axes 20 and 22 are disposed (1) parallel and offset from one another, (2) aligned with one another or (3) as shown at a predetermined operating angle so that they intersect at point 23. Each shaft may be provided with thrust or radial bearing surfaces (not shown) suitable for engaging such bearings. An end of each of the shafts includes means for pivotally coupling the shaft to a corresponding one of the intermediate members 16 and 18 so that the corresponding intermediate member is pivotable about an axis transverse, and preferably perpendicular to the rotation axis of the respective shaft.

More specifically, the end of each of the shafts 12 and 14 is provided with an open-ended hollow cylinder 24 having an internal wall defining cylindrical bearing surface 26. Cylinder 24 has its cylindrical axis 28 extending perpendicular to and intersecting with the corresponding rotation axis of the shaft to which the cylinder is secured. Each cylindrical axis 28 is equally distant from the intersection point 23. Each cylinder 24 is formed so that a proper weight distribution is provided by the cylinder about the respective rotation axis to prevent undesirable resonances.

The intermediate members 16 and 18 each include opposing substantially flat end plates 30 disposed parallel to one another. Each plate 30 includes a cylindrical opening 32 defining an internal cylindrical bearing surface 34. The internal radius of each bearing surface 34 preferably is the same as the internal radius of the bearing surface 26 of the cylinder 24. The openings 32 of each intermediate member are aligned with one another. The end plates 30 are spaced from one another so that the plates can be positioned at opposite ends of and slightly spaced from the respective ends of the cylinder 24 of the corresponding shaft with the axes of the cylindrical openings 32 being aligned with the cylindrical axis 28. Each intermediate member is pivotably connected to the cylinder 24 of the corresponding shaft by a connecting pin 36 having an outer, preferably cylindrical surface 38. Each pin is secured in place by any suitable means. For example, the pin can be formed as a bolt having a threaded end for receiving nut 40. The pin is then extended through the openings 32 and the corresponding cylinder 24, coaxially with the cylindrical axis 28 so that the corresponding intermediate member can pivot on the pin about the cylindrical axis 28 relative to the cylinder 24.

Intermediate member 16 is provided with a pair of plates 42 which are formed to the opposing end plates 30 of the member 16 at a position spaced from the openings 32 by a suitable amount so as to be spaced from the adjacent cylinder 24 of the shaft to which it is attached. The plates provide a slot therebetween defined by upper and lower spaced-apart bearing surfaces 44 and 46, respectively which extend parallel to one another in opposing relation.

Intermediate member 18 is provided with a single plate 48 formed to the opposing end plates 30 of the member 18 at a position spaced from the openings 32 by a suitable amount so as to be spaced from the adjacent cylinder 24 of the corresponding shaft 14 to which it is attached. The plate provides a tongue defining bearing surfaces 50 and 52 on its opposite sides which extend parallel to one another and oppose respectively the upper and lower bearing surfaces 44 and 46 of the slot of intermediate member 16. In order to provide a constant velocity coupling, the mid-plane of the tongue provided by plate 48 is also the mid-plane of the slot formed by bearing surfaces 46 and 48, the mid-planes being indicated generally as line 53 in FIG. 4, and the cylindrical axes 28 both lie in this common mid-plane.

To the extent described the construction is that of a conventional coupling of the type employing the principles of a Bartlett coupling. In such a coupling the internal cylindrical surface 26 of the cylinder 24 and the internal surfaces 34 of openings 32 of end plates 30 typically directly engage the cylindrical surface 38 of the corresponding connecting pin 36 and the upper and lower spaced-apart bearing surfaces 44 and 46 of the plate 42 typically directly engage the respective bearing surfaces 50 and 52 of plate 48. Since the bearing surfaces are usually made of metal, the surfaces of the prior art coupling are required to be properly sealed to maintain a proper amount of lubrication between opposing bearing surfaces. Such metal-to-metal surfaces are capable of carrying only relatively small compressive stress levels; provide heat and energy losses, provide relatively small restoring forces in response to angular or axial misalignment of the driving or driven member; can transmit noise and vibration, are subject to vibration-induced wear; require very close manufacturing tolerances providing relatively high manufacturing costs and create backlash in response to reverse low level torque loads.

According to the present invention, coupling 10 further comprises laminated elastomeric bearing means between the otherwise directly engaging bearing surfaces.

More particularly, cylindrical laminated bearing units 54 are provided between each of internal cylindrical surfaces 26 of the cylinders 24 and the cylindrical surface 38 of the corresponding connecting pin 36 and between each of the internal surfaces 34 of the openings 32 of the end plates 30 and the cylindrical surface 38 of the corresponding connecting pin 36. Similarly, substantially flat laminated bearing units 56 are provided between the opposing bearing surfaces 44 and 50 and between opposing bearing surfaces 46 and 52.

Figure 4:
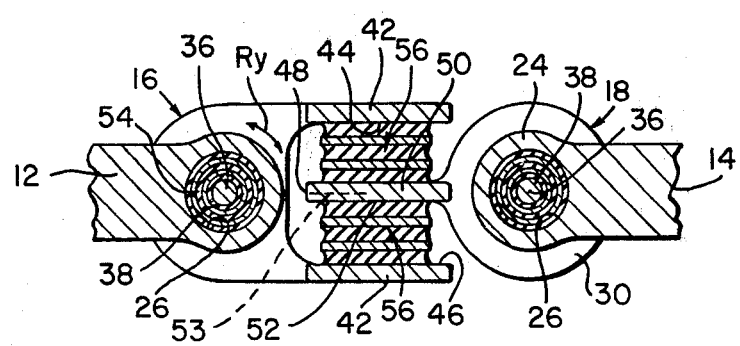
FIG. 4 is a sectional view of the FIG. 1 embodiment taken along line 4—4 of FIG. 1.

The bearing units 54 and 56 are preferably each of the "high compression laminate" type. Each of the units generally includes alternate layers 58 and 60 (the layers being cylindrical in each unit 54 and flat in each unit 56) respectively of a resilient, preferably elastomeric material, such as rubber or certain plastics, and a nonextensible material, such as metal, with the outermost and innermost layers preferably being elastomeric as shown. The layers are preferably bonded together, for example, with a suitable bonding cement with the innermost and outermost layers respectively engaging (e.g. by bonding or force fitting) the opposing bearing surfaces. By utilizing such laminated elastomeric bearing units, undesirable vibration can be at least partially dampened and noise, as well as vibration-induced wear and stress reduced. Further, energy is conserved since little or no heat is generated between the bearing surfaces. Due to the resiliency of the elastomeric material, these bearing units provide counteracting restoring forces to both shearing motion and compression. The size, thickness and number of layers of each unit 54 and 56 and the durometer of the elastomeric material depends upon the particular compression stress levels to be expected and the amount of coupling misalignment (i.e. angular and axial misalignment between shafts 12 and 14) to be accommodated. Preferably, the torsional misalignment spring rate of all the cylindrical bearing units 54 about the corresponding cylindrical axis 28 indicated by the arrow Ry in FIG. 4 are made equal. Similarly, the torsional misalignment spring rate of all the flat bearing units 56 about the center point 23 as indicated by the arrow Rx in FIG. 1 are made equal to one another, and equal to that of the cylindrical bearing units 54.

As shown best in FIGS. 1 and 4 a pair of flat laminated elastomeric units 56 is disposed between the opposing bearing surfaces 44 and 50 and a pair is disposed between opposing bearing surfaces 46 and 52. The units 56 are all substantially identical. Each of the units between bearing surfaces 44 and 50 and each of the units between bearing surfaces 46 and 52 are preferably disposed so that they are substantially equally spaced from the intersection point 23 of rotation axes 16 and 18 and thus all carry an equal compressive load. Further, each of the flat bearing units 56 is preferably symmetrically disposed about a plane extending through the intersection point 23 and bisecting the operating angle formed by rotation axes 20 and 22. It should be appreciated that a single flat laminated bearing unit can replace each pair as shown with the single flat unit extending between substantially the entire opposing bearing surfaces.

Although the embodiment shown in FIGS. 1-4 may be adequate in most situations, certain designs may require flat laminate bearing units which carry relatively large compressive stress levels, requiring relatively thick laminated bearing units. Accordingly, the FIGS. 1-4 embodiment can be modified by providing one intermediate member with more than one tongue, the other intermediate member being provided with a like number of slots for receiving the tongues, and flat laminated bearing units disposed between the opposing bearing surfaces of each of the tongues and slots.

Figure 5:
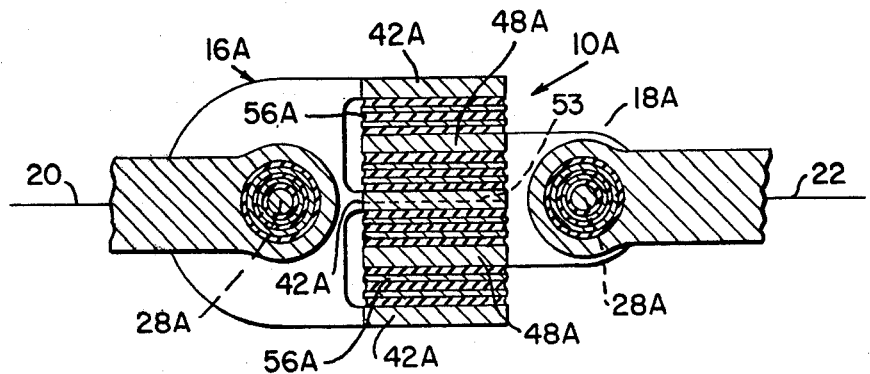
FIG. 5 is a sectional view, similar to FIG. 1, of an alternative embodiment of the present invention.

More particularly, as shown in FIG. 5, the alternative embodiments of the coupling designated 10A is identical to the embodiment, coupling 10 of FIGS. 1-4, except that the intermediate member 18A includes two plates 48A, and the intermediate member 16A includes three plates 42A. The plates are spaced from one another so as to provide equal spacing therebetween so as to accommodate identical flat laminate bearing units 56A. The mid-plane 53 of the middle plate 48A extends through the cylindrical axes 28A so as to provide a constant velocity coupling.

The coupling 10 and 10A of FIGS. 1-5 can accommodate axial misalignment of plunging motion when one or both of the driving and driven members moves along its rotation axis. The coupling can also accommodate angular misalignment when the axes 20 and 22 are disposed at an angle about the point 23. In either event the bearing units when placed in shear by virtue of any misalignment provides restoring forces to bring the driving and/or driven member back into the their proper orientation.

The flexible coupling 10 or 10A provides an almost constant velocity coupling at reasonable cost in a simple design. However, some applications require a true constant velocity coupling. Accordingly, the embodiment of FIGS. 1-4 or FIG. 5 can easily be modified to make the coupling a true constant velocity coupling where the coupling will be an axially fixed coupling, i.e., the axes 20 and 22 are fixed so as to intersect at point 23 at an angle to one another or so as to be aligned with one another.

Figure 6:
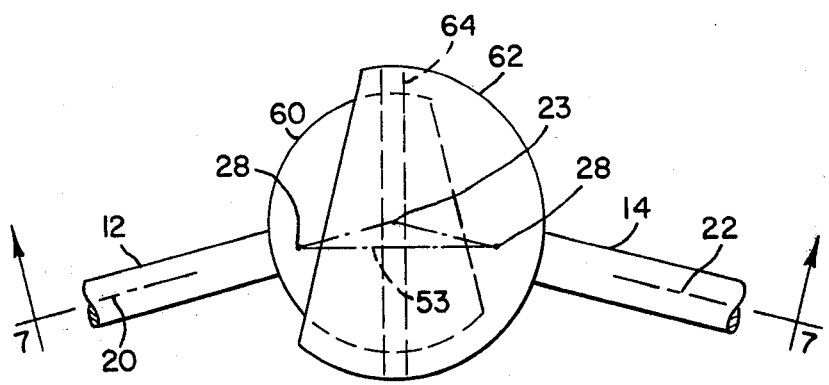
FIG. 6 is a side view of the preferred embodiment of the constant velocity high angle fixed joint coupling of the present invention.

For example, the normal operating orientation of the shafts are shown in FIG. 6 at an angle to one another. This results in the axes 20 and 22 being at an angle to one another about the point 23. The embodiment of FIG. 1 is modified by further including means for constraining the shafts about their respective rotation axes so that they can not move axially while at the same time allowing constant velocity torque loads to be transmitted through the coupling.

Figure 7:
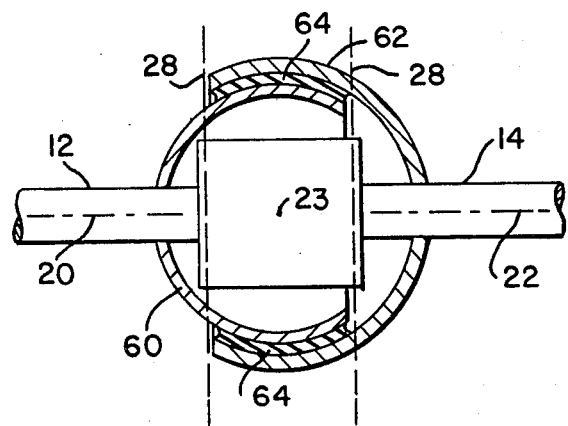
FIG. 7 is a longitudinal sectional view taken along line 7—7 of FIG. 6.

More particularly, as shown in FIGS. 6 and 7, the shafts 12 and 14 are modified to further respectively include spherical extensions 60 and 62. Extensions 60 and 62 are secured to the respective shafts 12 and 14, so as to rotate with them, and provide an equal weight distribution about the rotation axis to provide smooth rotation with the shafts. Each extension 60 and 62 includes a spherical section greater than a hemisphere but less than a sphere. The spherical sections each have their center of curvature at the midpoint 23 where the rotation axes intersect. As shown in FIG. 6, the midplane 53 of the intermediate members extend between the cylindrical axes 28. As the two members 12 and 14 rotate about their respective axes the spherical sections 60 and 62 are free to move with respect to one another about the point 23 to accommodate the kinematic changes in the relative surfaces of the spherical sections as they rotate through each revolution of the coupling. The kinematics of a coupling are generally described in my U.S. Pat. No. 4,208,889 issued June 24, 1980.

The opposing spherical surfaces of sections 60 and 62 can be allowed to contact one another since they carry little or no compressive loads. However, due to the shear between these sections as they rotate about their respective axes, a layer 64 of resilient material, such as an elastomer, is preferably disposed between the opposing spherical surfaces so as to carry the relative motion in shear without friction. The layer 64 of elastomer is preferably in the form of a circular band extending 360° around the point 23, having a midplane passing through point 23 and bisecting the angle between rotation axes 20 and 22, although other arrangements of elastomeric material can be provided.

The invention as herein described has many advantages over the prior art Bartlett couplings. For one, by using elastomeric, high compression laminated bearings, the compressive loads which can be carried by these bearings can be increased. This result occurs due to the increased shape factor provided by these bearings with a consequential decrease in stress from bulging. By using high compression laminated bearings the bearing surfaces need not be lubricated, mechanical wear can be reduced and energy conserved. Energy losses, believed due to the hysteresis effects in the elastomer between the bearing surfaces are typically well below that of the lubricated metal-to-metal bearing surfaces provided by the prior art. Due to the elastomeric nature of the bearings, undesirable vibration can be at least partially dampened and noise, as well as vibration induced wear and stress can be reduced. The elastomeric material provides restoring forces due to misalignment and is capable of accommodating angular and axial misalignment as well as shearing motion resulting from such misalignment. Finally, by providing the spherical extensions 60 and 62, a true-constant velocity, fixed coupling can be provided. Still other advantages will be obvious to persons skilled in the art.

What is claimed is:
1. A flexible coupling of the type comprising:
a driving member rotatable about a first axis;
a driven member rotatable about a second axis;
a first intermediate member;
first coupling means for coupling said first intermediate member to said driving member so that said first intermediate member is capable of pivoting with respect to said driving member about a third axis transverse to said first axis when torque is applied to said driving member;
a second intermediate member;
second coupling means for coupling said second intermediate member to said driven member so that said second intermediate member is capable of pivoting with respect to said driven member about a fourth axis transverse to said second axis when torque is applied to said driving member;

third coupling means for coupling said first intermediate member to said second intermediate member so that said second intermediate member is capable of moving in shear with respect to, as well as rotating with, said first intermediate member when torque is applied to said driving member;

wherein said first and second coupling means each comprises cylindrical laminated elastomeric bearing means and said third coupling means comprises substantially flat laminated elastomeric bearing means, each of said first and second cylindrical laminated elastomeric means and said flat laminated elastomeric bearing means comprising a plurality of alternating layers of resilient and nonextensible materials; and wherein one of said intermediate members includes at least one pair of spaced apart plates having first and second parallel opposing flat bearing surfaces, the other of said intermediate members includes at least one plate having opposing sides for defining parallel third and fourth flat bearing surfaces, said one plate being disposed between said spaced apart plates so that said first flat bearing surface opposes said third flat bearing surface and said second flat bearing surface opposes said fourth flat bearing surface, and said flat laminated elastomeric bearing means are disposed between said first and third flat bearing surfaces and between said second and fourth flat bearing surfaces.

2. A coupling according to claim 1, wherein said flat laminated bearing means includes at least four flat laminated elastomeric bearing units, two of said units being disposed between said first and third flat bearing surfaces and the other two of said units being disposed between said second and fourth flat bearing surfaces.

3. A coupling according to claim 1, wherein said one intermediate member includes at least three spaced apart plates so as to define at least two slots therebetween, and said other intermediate member includes at least two plates so as to define two tongues extending in the corresponding slots of the one intermediate member, said three and two plates being spaced from one another so as to form mutually spaced opposing bearing surfaces between each of the three plates and a respective one of the two plates, and said flat laminated elastomeric bearing means are disposed between said opposing bearing surfaces.

4. A flexible coupling of the type comprising:
a driving member rotatable about a first axis;
a driven member rotatable about a second axis;
a first intermediate member;
first coupling means for coupling said first intermediate member to said driving member so that said first intermediate member is capable of pivoting with respect to said driving member about a third axis transverse to said first axis when torque is applied to said driving member;
a second intermediate member;
second coupling means for coupling said second intermediate member to said driven member so that said second intermediate member is capable of pivoting with respect to said driven member about a fourth axis transverse to said second axis when torque is applied to said driving member;
third coupling means for coupling said first intermediate member to said second intermediate member so that said second intermediate member is capable of moving in shear with respect to, as well as rotating with, said first intermediate member when torque is applied to said driving member;

wherein said first and second coupling means each comprises cylindrical laminated elastomeric bearing means and said third coupling means comprises substantially flat laminated elastomeric bearing means, each of said first and second cylindrical laminated elastomeric bearing means comprising a plurality of alternating layers of resilient and nonextensible materials; and wherein said driving and driven members are capable of being rotatably mounted so that the first and second axes intersect with one another, said coupling further including means for axially constraining said driving and driven members relative to one another so that said coupling is a true constant velocity coupling.

5. A coupling according to claim 4, wherein said means for constraining includes a first axial constraining member adapted to rotate with said driving member, and a second axial constraining member adapted to rotate with said driven member.

6. A coupling according to claim 4, wherein said first and second axes intersect one another and said constraining means includes first and second spherical sections having their centers of curvature substantially at the intersection of said first and second axes, said spherical sections interfitting with one another so as to move in shear with respect to one another as said spherical sections rotate about the respective first and second axis.

7. A coupling according to claim 6, wherein said constraining means further includes resilient means disposed between said spherical sections so as to carry in shear relative motion between said spherical sections.

8. A flexible coupling of the type comprising:
a driving member rotatable about a first axis;
a driven member rotatable about a second axis;
a first intermediate member;
first coupling means for coupling said first intermediate member to said driving member so that said first intermediate member is capable of pivoting with respect to said driving member about a third axis transverse to said first axis when torque is applied to said driving member;
a second intermediate member;
second coupling means for coupling said second intermediate member to said driven member so that said second intermediate member is capable of pivoting with respect to said driven member about a fourth axis transverse to said second axis when torque is applied to said driving member;
third coupling means for coupling said first intermediate member to said second intermediate member, said third coupling means comprising substantially flat laminated elastomeric bearing means of alternating layers of resilient and non-extensible materials; and wherein one of said intermediate members includes at least one pair of spaced apart plates having first and second parallel opposing flat bearing surfaces, the other of said intermediate members includes at least one plate having opposing sides for defining parallel third and fourth flat bearing surfaces, said one plate being disposed between said spaced apart plates so that said first flat bearing surface opposes said third flat bearing surface and said second flat bearing surface opposes said fourth flat bearing surface, and said flat laminated elastomeric bearing means are disposed between said first and third flat bearing surfaces and between said second and fourth flat bearing surfaces.

9. The coupling of claim 8 wherein the first axis and the second axis intersect and further including a first extension generally in the shape of a spherical section secured to the driving member and a second extension generally in the shape of a spherical section secured to the driven member, said first and second extension disposed concentric to one another and having their center of curvature substantially disposed coincident with the intersection of said axes, wherein the extensions constrain the relative movement of the driving and driven members by limiting the motion to that about the intersection.

10. A flexible coupling of the type comprising:
a driving member rotatable about a first axis;
a driven member rotatable about a second axis;
a first intermediate member;
first coupling means for coupling said first intermediate member to said driving member so that said first intermediate member is capable of pivoting with respect to said driving member about a third axis transverse to said first axis when torque is applied to said driving member;
a second intermediate member;
second coupling means for coupling said second intermediate member to said driven member so that second intermediate member is capable of pivoting with respect to said driven member about a fourth axis transverse to said second axis when torque is applied to said driving member;
third coupling means for coupling said first intermediate member to said second intermediate member so that said second intermediate member is capable of moving in shear with respect to, as well as rotating with, said first intermediate member when torque is applied to said driving member;
wherein said first and second coupling means each comprises cylindrical laminated elastomeric bearing means and said third coupling means comprises substantially flat laminated elastomeric bearing means, each of said first and second cylindrical laminated elastomeric means and said flat laminated elastomeric bearing means comprising a plurality of alternating layers of resilient and nonextensible materials,
wherein each of the layers comprising the flat laminated elastomeric bearing extends generally parallel to a plane defined by the first and third axes when the first and second axes are colinear.

11. A coupling according to claim 10, wherein each of said driving and driven members includes means for defining a first cylindrical bearing surface, each of said intermediate members includes means for defining a second cylindrical bearing surface, and said first and second coupling means each include means defining a third cylindrical bearing surface opposing and spaced from each of said first and second cylindrical bearing surfaces, and said first and second cylindrical laminated elastomeric means are respectively disposed between the first cylindrical bearing surface and the opposing third cylindrical bearing surface and between the second cylindrical bearing surface and the opposing third cylindrical bearing surface.

* * * * *